Oct. 25, 1960 J. S. HICKMAN ET AL 2,958,078
SOUND SIGNALING SYSTEM HAVING A VARIABLE
RELUCTANCE TRANSMITTER-CONDENSER
RECEIVER TRANSDUCER
Filed June 24, 1957
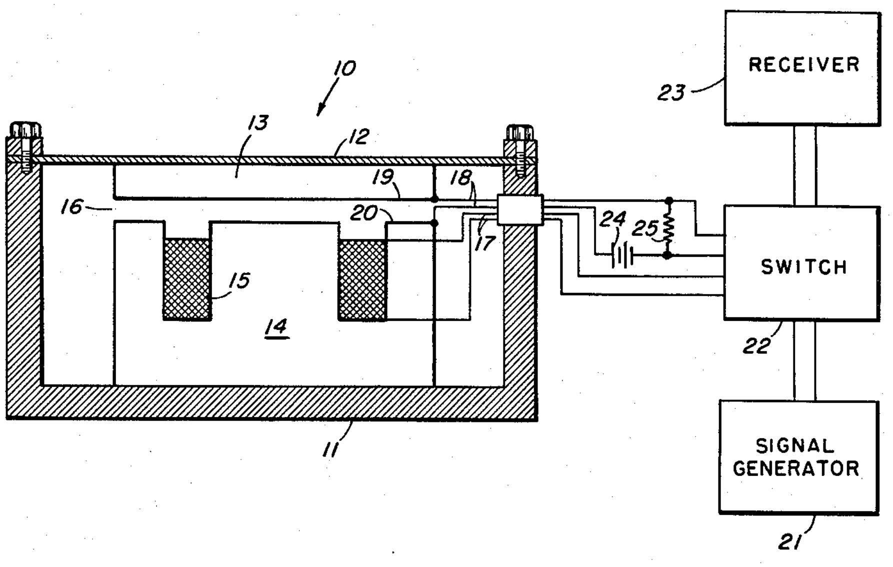
INVENTOR.
JOHN S. HICKMAN
GORDON E. MARTIN
BY George Sipkin
George E. Pearson
ATTORNEYS United States Patent Office 2,958,078

Patented Oct. 25, 1960

2,958,078

SOUND SIGNALING SYSTEM HAVING A VARIABLE RELUCTANCE TRANSMITTER-CONDENSER RECEIVER TRANSDUCER

John S. Hickman, 3242 Lucinda St., San Diego 6, Calif., and Gordon E. Martin, 2627 Burgener Blvd., San Diego 10, Calif.

Filed June 24, 1957, Ser. No. 667,720

2 Claims. (Cl. 340—313)

(Granted under Title 35, U.S. Code (1952), sec. 266)

The invention described herein may be manufactured and used by or for the Government of the United States of America for governmental purposes without the payment of any royalties thereon or therefor.

The present invention relates to a sound signaling system having a variable reluctance transmitter-condenser receiver transducer and more particularly to a sound signaling system in which transmission of the waves is accomplished by means of a variable reluctance transmitter and reception is accomplished by utilizing the iron interfaces and the air gap between the stator and armature of the transmitter's electromagnet as a condenser receiver entirely separate from any magnetic phenomenon associated with the transmitter circuit.

Heretofore sound signaling systems which used a variable reluctance device for both transmission and reception also required the use of extensive circuitry for the elimination of spurious alternating current when the system operated as a receiver. In such operation a polarizing direct current and an alternating current component signal were applied to the coil of the variable reluctance transmitter for varying the size of the air gap between the armature and the stator. Such variations in gap size were transmitted through connection between the armature and diaphragm to the surrounding medium as acoustic radiation. Under these conditions the polarizing direct current could have reasonably small spurious alternating current super-imposed thereon without seriously impairing the operation of the device as a transmitter. However, when the variable reluctance device was alternately used as a receiver the presence of spurious alternating current seriously impaired the operation of the apparatus particularly when the spurious signals were of the same order of magnitude as the incoming acoustic signal.

In the apparatus of the present invention the disadvantages of prior art devices is corrected by using the iron interfaces and the air gap between the coil and the armature of a variable reluctance transmitter as a condenser receiver wherein the transmitted signal is imparted to the surrounding medium by means of the variable reluctance transmitter but the received signal is taken from the iron interfaces of the armature and stator. The receiving circuit is thus a condenser receiver whose operation is entirely separate from any magnetic interference from the transmitting circuit.

An object of the present invention is the provision of an improved sound signaling system.

Another object of the present invention is to provide an improved sound signaling system having a transducer which operates alternately as a variable reluctance transmitting device and as a condenser receiver.

Still another object is the provision of an improved sound signaling system having a transducer which operates alternately as a variable reluctance transmitter and condenser receiver of increased signal to noise ratio.

A further object of the invention is the provision of an improved sound signaling system having a transducer which operates alternately as a variable reluctance transmitter and as a condenser receiver without interference by and spurious current effects associated with the transmitter circuit.

A final object of the present invention is to provide an improved sound signaling system having a transducer which operates alternately as a variable reluctance transmitter and a condenser receiver wherein the iron interfaces and air gap between the coil and armature of the transmitter are used as the condenser receiver without interference by any undesirable current effects in the transmitter circuit.

Other objects and many of the attendant advantages of this invention will be readily appreciated as the same becomes better understood by reference to the following detailed description when considered in connection with the accompanying drawing.

Referring now to the drawing, there is shown a transducer 10, a signal generator 21, a receiver 23 and a switch 22 for feeding a transmitting signal to the transducer when the signal generator is on, and to connect the transducer to the receiver when the signal generator is off.

11 is a case, 12 a diaphragm, 13 the armature of an electromagnet electrically isolated from 14 the stator of the electromagnet, 15 the magnetizing coil for the electromagnet, leads 17 for the coil, a gap 16 between the faces 19 and 20 of the armature and the electromagnet, respectively, leads 18 connected to the faces 19 and 20, a source of potential 24 in series, and a resistor 25 in parallel.

In operation of the device as a transmitting apparatus, it is evident that the switch 22 is activated to connect the signal generator 21 to the transducer 10. A polarizing direct current and an alternating current component are applied to the coil 15 through the leads 17 to activate the electromagnet which drives the armature 13 by forces resulting from magnetic reactions in accordance with the applied currents. The forces thus resulting are applied to the medium surrounding the diaphragm.

In operation as a receiving apparatus the switch 22 is activated to disconnect the signal generator 21 and to connect the transducer 10 to the receiver 23 through the leads 18. Sound waves impinging on the diaphragm 12 serve to move the armature in accordance with the variations of the sound waves and produce corresponding variations in the gap between the faces of the armature and the electromagnet. The variations thus produced serve to vary the capacitance of the air gap condenser formed between the armature and the electromagnet which produces a corresponding voltage drop across the resistor 25 to be amplified and fed to the receiver 23.

Obviously many modifications and variations of the present invention are possible in the light of the above teachings. It is therefore to be understood that within the scope of the appended claims, the invention may be practiced otherwise than as specifically described.

What is claimed is:

1. In a sound signalling system comprising a casing having an opening therein, a diaphragm fixed to said casing in fluid-tight manner over said opening, an armature fixed on said diaphragm and positioned within said casing, electromagnetic means mounted within said casing, both said armature and said electromagnetic means having faces in opposed relationship to one another, said faces having an air gap therebetween, means for applying an electrical potential across said gap, signal generating means, receiver means, means for connecting alternately said signal generating means to said electromagnetic means and said receiver means to said faces, respectively, and a resistor connected across said means for connecting said receiver means to said faces whereby sound waves impinging on said diaphragm produce variations in said air gap to vary the capacitance therebetween thereby changing the voltage drop across said resistor for amplification in said receiving means.

2. Sound wave signalling and receiving apparatus for use with a signal source and a receiver, the apparatus comprising a casing, an acoustical diaphragm forming an external surface of the casing, armature means movable with said diaphragm, electromagnetic means disposed within the casing, both said means having faces in an opposed and spaced relationship one to the other for providing condenser plates, means for applying an electrical potential across said plates, electric circuit means for coupling said signal source to said electromagnetic means, electric circuit coupling means for applying said plate potential to said receiver, and means for alternating the coupling of said signal source and receiver, whereby said apparatus selectively permits sound wave radiation and reception.

References Cited in the file of this patent

UNITED STATES PATENTS 2,857,461 Brodie ---------------- Oct. 21, 1958

OTHER REFERENCES

"Acoustical Engineering," by H. F. Olson, pp. 672, 673, 687 and 688, published by Van Nostrand, 1957.